US011054686B2

(12) United States Patent
Fu

(10) Patent No.: US 11,054,686 B2
(45) Date of Patent: Jul. 6, 2021

(54) DISPLAY PANEL INCLUDING OLEDS AND MICRO-LEDS, THE MANUFACTURING METHOD OF THE DISPLAY PANEL, AND DISPLAY DEVICE UTILIZING THE DISPLAY PANEL AND ACHIEVING A NARROW BORDER REGION

(71) Applicant: Shanghai Tianma Micro-Electronics Co., Ltd., Shanghai (CN)

(72) Inventor: Jujian Fu, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 0 days.

(21) Appl. No.: 16/719,429

(22) Filed: Dec. 18, 2019

(65) Prior Publication Data
US 2020/0310180 A1 Oct. 1, 2020

(30) Foreign Application Priority Data
Mar. 29, 2019 (CN) .......................... 201910252990.0

(51) Int. Cl.
*G02F 1/1333* (2006.01)
*G02F 1/1343* (2006.01)
*G02F 1/29* (2006.01)

(52) U.S. Cl.
CPC ...... *G02F 1/13336* (2013.01); *G02F 1/13439* (2013.01); *G02F 1/133308* (2013.01); *G02F 1/292* (2013.01)

(58) Field of Classification Search
CPC .. G02F 1/13336; G02F 1/292; G02F 1/13439; G02F 1/133308
See application file for complete search history.

(56) References Cited

U.S. PATENT DOCUMENTS

2018/0039118 A1* 2/2018 Chen ................. G02F 1/133308
2018/0152551 A1* 5/2018 Lynch ................. H04M 1/0268
(Continued)

FOREIGN PATENT DOCUMENTS

| CN | 108011051 A | 5/2018 |
| CN | 108986678 A | 12/2018 |
| JP | 2001189171 A * | 7/2001 |

OTHER PUBLICATIONS

Bo Et al. CN108011051, machine translation , May 2018 (Year: 2018).*

(Continued)

*Primary Examiner* — Tracie Y Green
(74) *Attorney, Agent, or Firm* — von Briesen & Roper, s.c.

(57) ABSTRACT

Provided are a display panel, a display device and a manufacturing method of a display panel. The display panel includes: a display region including a first display region and a second display region. In the first display region, a surface of a first substrate facing towards a second substrate is provided with a plurality of organic light emitting elements. In the second display region, a surface of the second substrate facing towards the first substrate is provided with a plurality of Micro Light Emitting Diodes (LEDs) and a plurality of second traces. An encapsulation frame is further configured between the first substrate and the second substrate, and the encapsulation frame is disposed in a frame region and surrounds the display region. In the frame region, the surface of the first substrate facing towards the second substrate is provided with a plurality of first traces.

12 Claims, 8 Drawing Sheets

(56) References Cited

U.S. PATENT DOCUMENTS

2018/0196566 A1* 7/2018 Lu .......................... G06F 3/0414
2020/0081308 A1* 3/2020 Yoshida ............ G02F 1/136286
2020/0083203 A1* 3/2020 Hsu .................... G02F 1/13336

OTHER PUBLICATIONS

Xia et al., CN108986678, machine translation Dec. 2018 (Year: 2018).*
Suga et al, JP3624818 ,(JP2001189171), 2001 machine translation (Year: 2001).*
Office Action for related Chinese Application No. 201910252990.0; report dated Aug. 27, 2020.

* cited by examiner

DISPLAY PANEL INCLUDING OLEDS AND MICRO-LEDS, THE MANUFACTURING METHOD OF THE DISPLAY PANEL, AND DISPLAY DEVICE UTILIZING THE DISPLAY PANEL AND ACHIEVING A NARROW BORDER REGION

CROSS-REFERENCES TO RELATED APPLICATIONS

This application claims priority to Chinese patent application No. CN201910252990.0 filed on Mar. 29, 2019, the disclosure of which is incorporated herein by reference in its entirety.

TECHNICAL FIELD

The present disclosure relates to display techniques and, in particular, relates to a display panel, a display device and a manufacturing method of a display panel.

BACKGROUND

With the development of display techniques, more and more display panels and display devices are used in people's daily life and work. In order to improve the user experience, sensor modules, such as cameras, infrared sensors and the like, are typically integrated in existing display panel structures.

At present, in order to satisfy a high screen-to-body ratio, a hollowed-out region is usually provided in an intermediate region at one end of the display panel, and a sensor module is disposed in the hollowed-out region. On this basis, in order to achieve full screen display, a Micro LED is usually bound in the hollowed-out region to enable image display in the hollowed-out region by using the Micro LED. In this structure, in order to drive the Micro LED to emit light, a flexible printed circuit board bound to the Micro LED needs to be provided. If the flexible printed circuit board is disposed on one side of the hollowed-out region of the display panel, the flexible printed circuit boards are disposed on two opposite sides of the display panel, which makes the driving design of the display panel difficult. In order to solve this problem, the flexible printed circuit boards each may be disposed at the bottom of the display panel. However, a trace led by the flexible printed circuit board is extended to the top of the display panel to be electrically connected to the Micro LED, and the design of the part of the trace results in a wider frame of the display panel, which is not conducive to the narrow frame design of the display panel.

SUMMARY

Embodiments of the present disclosure provide a display panel, a display device and a manufacturing method of a display panel to reduce the problems that the frame of the display panel caused by laying the trace is wider, and therefore the narrow frame design of the display panel is achieved.

In a first aspect, embodiments of the present disclosure provide a display panel, and the display panel includes a first substrate and a second substrate disposed opposite to the first substrate.

The display panel includes a display region and a frame region surrounding the display region. The display region includes a first display region and a second display region, the second display region is reused as a sensor reserved region, and the second display region includes a light transmitting region and a light emitting region.

In the first display region, a surface of the first substrate facing towards the second substrate is provided with a plurality of organic light emitting elements.

In the second display region, a surface of the second substrate facing towards the first substrate is provided with a plurality of Micro Light Emitting Diodes (LEDs) and a plurality of second traces, and the Micro LEDs are disposed in the light emitting region.

An encapsulation frame is further configured between the first substrate and the second substrate, and the encapsulation frame is disposed in the frame region and surrounds the display region.

In the frame region, the surface of the first substrate facing towards the second substrate is provided with a plurality of first traces.

Vertical projections of the plurality of first traces on the first substrate are at least partially overlapped with a vertical projection of the encapsulation frame on the first substrate.

The plurality of second traces are electrically connected to the plurality of Micro LEDs, and the plurality of second traces extend to the frame region; a conductive structure is configured in the encapsulation frame, and the plurality of second traces are electrically connected to the plurality of first traces through the conductive structure in the encapsulation frame.

In a second aspect, embodiments of the present disclosure further provide a display device. The display device includes the display panel provided in the first aspect, and further includes a sensor module.

The sensor module is configured in the second display region and disposed on one side of the first substrate facing away from the second substrate. A light-sensitive surface of the sensor module faces towards the first substrate side.

In a third aspect, embodiments of the present disclosure further provide a manufacturing method of a display panel. The method includes the steps described below.

A first substrate is provided, a plurality of organic light emitting elements are formed in a first display region, and a plurality of first traces are formed in a frame region. Where the first substrate includes a display region and the frame region surrounding the display region, the display region includes the first display region and a second display region, the second display region is reused as a sensor reserved region, and the second display region includes a light transmitting region and a light emitting region.

A second substrate is provided, a plurality of Micro LEDs and a plurality of second traces are formed in the second display region, where the plurality of Micro LEDs are disposed in a light emitting region, the plurality of second traces are electrically connected to the plurality of Micro LEDs, and the plurality of second traces extend to a frame region. Where the second substrate includes a display region and the frame region surrounding the display region, the display region includes a first display region and the second display region, the second display region is reused as a sensor reserved region, and the second display region includes a light transmitting region and the light emitting region.

An encapsulation frame is formed in the frame region of the first substrate or the frame region of the second substrate, where a conductive structure is configured in the encapsulation frame, and the encapsulation frame surrounds the display region.

The first substrate is attached to the second substrate.

One side of the first substrate provided with the plurality of organic light emitting elements faces towards one side of the second substrate provided with the plurality of Micro LEDs, and the encapsulation frame is disposed between the first substrate and the second substrate. Vertical projections of the plurality of first traces on the first substrate are at least partially overlapped with a vertical projection of the encapsulation frame on the first substrate are at least partially overlapped, and the plurality of second traces are electrically connected to the plurality of first traces through the conductive structure in the encapsulation frame.

For the display panel provided by the embodiments of the present disclosure, vertical projections of the first traces on the first substrate are at least partially overlapped with a vertical projection of the encapsulation frame on the first substrate, so that the first traces may be disposed in at least part of the encapsulation frame region. Compared with the structure in which such part of traces are configured in a non-display region provided independently from the encapsulation frame region in the related art, the structure provided in the present disclosure may reduce the ratio of the non-display region in the display panel, and thereby the screen-to-body ratio is improved and the narrow frame design of the display panel is achieved.

DETAILED DESCRIPTION

Figure 1:
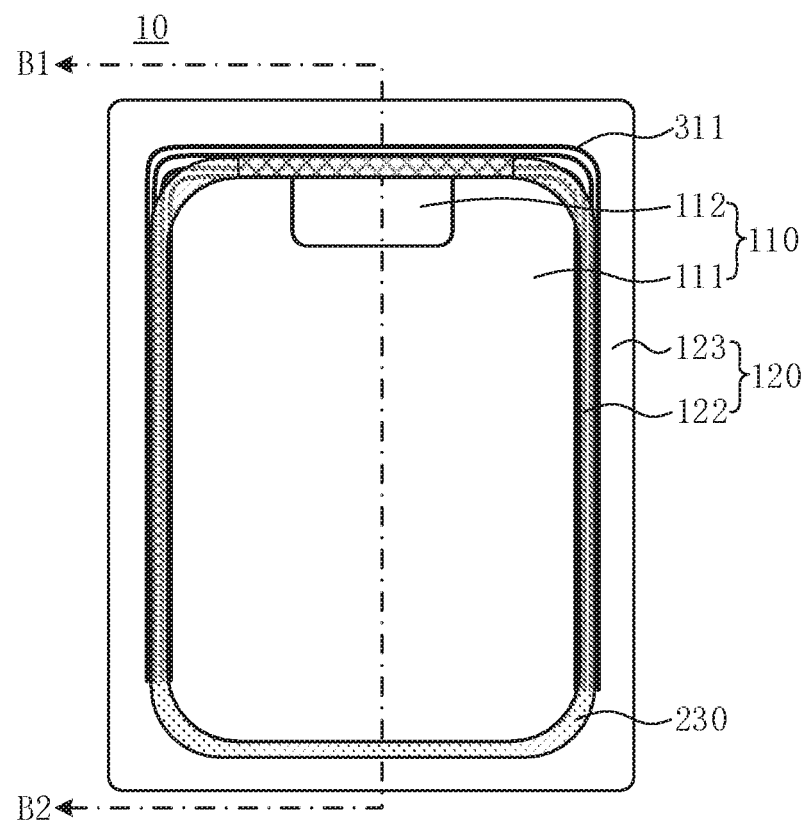
FIG. 1 is a structural diagram of a display panel according to an embodiment of the present disclosure.

Hereinafter the present disclosure will be further described in detail in conjunction with the drawings and embodiments. It is to be understood that the specific embodiments set forth below are intended to illustrate and not to limit the present disclosure. Additionally, it is to be noted that, for ease of description, only part, not all, of the structures related to the present disclosure are illustrated in the drawings.

Figure 2:
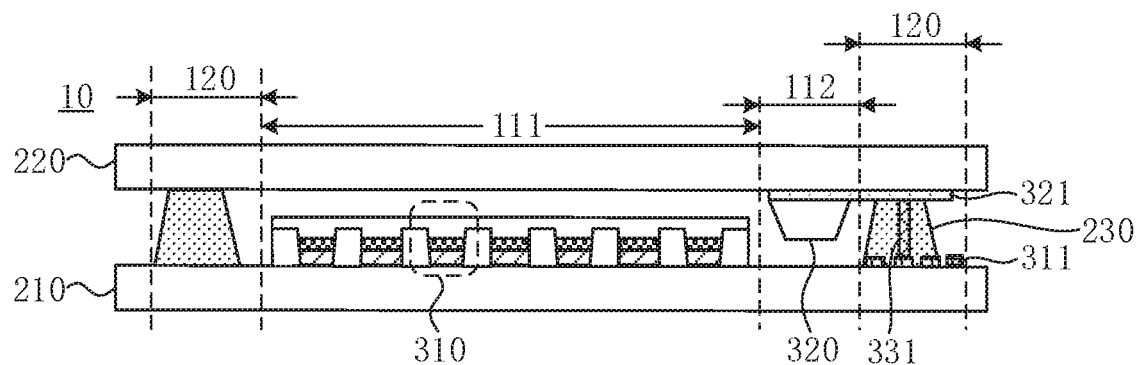
FIG. 2 is a cross-sectional view of a structure of the display panel of FIG. 1 taken along a Line B1-B2.

FIG. 1 is a structural diagram of a display panel according to an embodiment of the present disclosure, and FIG. 2 is a cross-sectional view of a structure of the display panel of FIG. 1 taken along a line B1-B2. Referring to FIGS. 1 and 2, a display panel 10 includes: a first substrate 210 and a second substrate 220 which are disposed opposite to each other. The display panel 10 includes: a display region 110 and a frame region 120 surrounding the display region 110. The display region 110 includes a first display region 111 and a second display region 112, the second display region 112 is reused as a sensor reserved region 112, and the second display region 112 includes a light transmitting region and a light emitting region. In the first display region 111, a surface of the first substrate 210 facing towards the second substrate 220 is provided with a plurality of organic light emitting elements 310. In the second display region 112, a surface of the second substrate 220 facing towards the first substrate 210 is provided with a plurality of Micro LEDs 320 and a plurality of second traces 321, and the Micro LEDs 320 are disposed in the light emitting region. An encapsulation frame 230 is further disposed between the first substrate 210 and the second substrate 220, and the encapsulation frame 230 is configured in the frame region 120 and surrounds the display region 110. In the frame region 120, the surface of the first substrate 210 facing towards the second substrate 220 is provided with a plurality of first traces 311. Vertical projections of the plurality of first traces 311 on the first substrate 210 are at least partially overlapped with a vertical projection of the encapsulation frame 230 on the first substrate 210. The plurality of second traces 321 are electrically connected to the plurality of Micro LEDs 320, and the plurality of second traces 321 extend to the frame region 120; a conductive structure 331 is configured in the encapsulation frame 230, and the plurality of second traces 321 are electrically connected to the plurality of first traces 311 through the conductive structure 331 in the encapsulation frame 230.

Exemplarily, taking an organic light emitting panel as an example, the first substrate 210 may include an array substrate, the second substrate 220 may include a protective cover plate or an encapsulation cover plate. The organic light emitting elements 310 are configured on a surface of the array substrate facing towards the protective cover plate, and the Micro LEDs 320 are disposed on a surface of the protective cover plate facing towards the array substrate.

The first display region 111 is a display region in a conventional organic light emitting panel, and may include a plurality of scanning lines and a plurality of data lines, the plurality of scanning lines and the plurality of data lines being intersected and insulated, which defines a plurality of sub-pixel regions. One organic light emitting element 310 is configured in each sub-pixel region, and a scanning line and a data line may be perpendicular to each other.

The second display region 112 is the sensor reserved region 112, that is, a back surface of the display panel 10 in the second display region 112 needs to be provided with a sensor in a subsequent process. The Micro LEDs 320 are disposed in the light emitting region of the second display region 112. The size of a Micro LED 320 is on the order of micrometers, and is smaller than the size of an organic light emitting element 310. According to the display panel 10 provided by the embodiments of the present disclosure, the characteristic that the Micro LEDs 130 are small in size is utilized, so that a light transmitting region with a large area and high light transmittance can be reserved while the image display in the second display region 112 is ensured, and thus, the sensor on the back surface of the display panel 10 can be ensured to work normally. In order to ensure that the display panel 10 has a high light transmittance so as to ensure normal operation of the sensor, base substrates having high transmittance (exemplarily, greater than or equal to 85%) need to be selected as the first substrate 210 and the second substrate 220, and exemplarily, transparent glass substrates may be selected.

The film structure of the organic light emitting element 310 and the film structure of the Micro LED 320 may be any structures known to those skilled in the art, and will not be described herein again and not limited in the embodiments of the present disclosure.

The frame region 120 surrounds the display region 110, and the frame region 120 is not used for displaying an image. The frame region 120 may be used for disposing the traces, circuit elements such as shift registers, and the like, as well as an encapsulation structure.

Exemplarily, the frame region 120 may include an encapsulation region 122 and a peripheral region 123. The encapsulation region 122 is used for providing the encapsulation frame 230 to attach the first substrate 210 to the second substrate 220 for encapsulation. The peripheral region 123 surrounds the encapsulation region 122, and may be used for providing the circuit elements or other structures known to those skilled in the art, which is not limited in the embodiments of the present disclosure.

Exemplarily, the encapsulation frame 230 may include a glass frit encapsulation frame or an adhesive sealing frame or other types of encapsulation frames known to those skilled in the art, which is not limited in the embodiments of the present disclosure.

The Micro LEDs 320 are electrically connected to the first traces 311 on the first substrate 210 through the second traces 321 on the second substrate 220 and the conductive structure 331 in the encapsulation frame 230 in sequence.

In the embodiments of the present disclosure, a vertical projection of the plurality of first traces 311 on the first substrate 210 and a vertical projection of the encapsulation frame 230 on the first substrate 210 are at least partially overlapped, and thus the first traces 311 may be disposed in at least part of the encapsulation region 122, that is, reuse of the encapsulation region is achieved. Therefore, it is not necessary to provide one non-display region separately for disposing the first traces 311, so that the ratio of the non-display region in the display panel 10 may be reduced, the screen-to-body ratio may be improved, and the narrow frame design of the display panel 10 may be achieved.

It is to be noted that FIG. 1 merely exemplarily shows that in the display panel 10, the number of first display regions 111 is one and the number of second display regions 112 is one, and that the frame region 120 further includes the peripheral region 123 surrounding the frame region 122, which does not intend to limit the display panel 10 provided in the embodiments of the present disclosure. In other embodiments, the numbers and arrangement of the first display region 111 and the second display region 112 included in the display panel 10 may also be set according to actual requirements of the display panel 10, and the display panel 10 may not include the peripheral region 123, which is not limited in the embodiments of the present disclosure.

Secondly, it is to be noted that FIG. 2 merely exemplarily shows the number of organic light emitting elements 310 in the first display region 111 is 7, that the number of Micro LEDs 320 in the second display region 112 is 1, and that the number of first traces 311 in the frame region 120 is 4, which does not intend to limit the display panel 10 provided in the embodiments of the present disclosure. In other embodiments, the number of organic light emitting elements 310, the number of Micro LEDs 320 and the number of first traces 311 may be set in accordance with the actual requirements of the display panel 10, which is not limited in the embodiments of the present disclosure.

Figure 3:
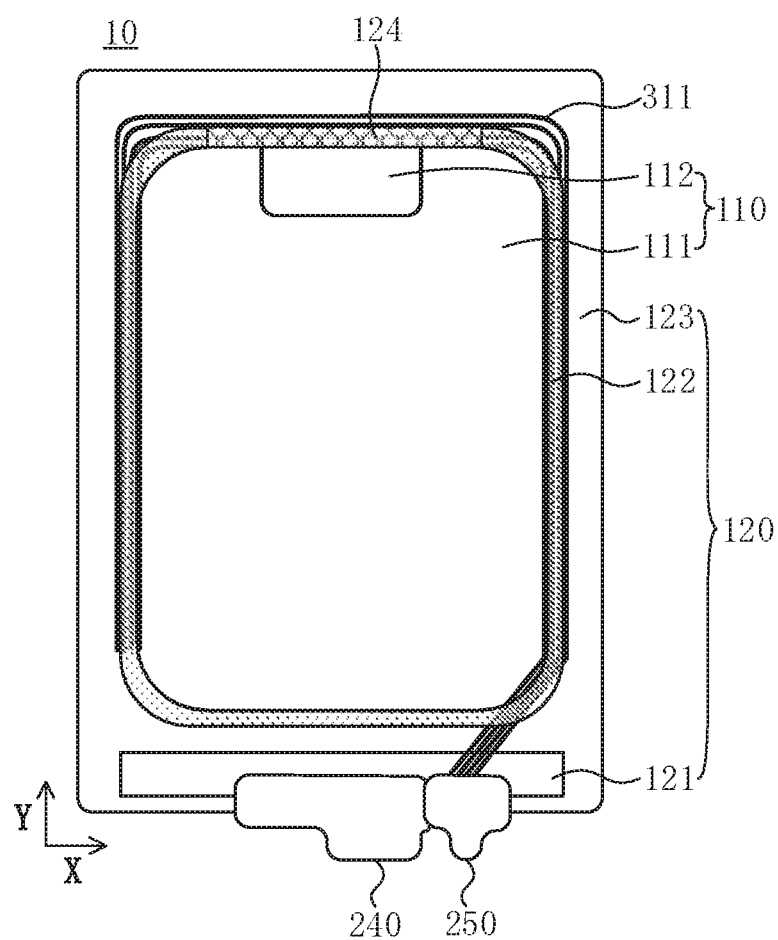
FIG. 3 is a structural diagram of another display panel according to an embodiment of the present disclosure.

Optionally, FIG. 3 is a structural diagram of another display panel according to an embodiment of the present disclosure. Referring to FIGS. 2 and 3, a frame region 120 includes a binding region 121, the binding region 121 and a second display region 112 are disposed on two opposite sides of a first display region 111, respectively. One end of a first trace 311 is electrically connected to a second trace 321 through a conductive structure 331 in an encapsulation frame 230, and the other end of the first trace 311 extends to the binding region 121.

The binding region 121 is used for binding an integrated driving circuit. Exemplarily, the binding region 121 may be used for binding a first flexible printed circuit board 240 and a second flexible printed circuit board 250. Exemplarily, the first flexible printed circuit board 240 is used for driving organic light emitting elements 310 to emit light, and the second flexible printed circuit board 250 is used for driving Micro LEDs 320 to emit light. This is only a division of the functions of the integrated driving circuit, and in the actual display panel product, the integrated driving circuit may also have the structure of a monolithic circuit board, which is not limited in the embodiments of the present disclosure.

Exemplarily, taking the orientation shown in FIG. 3 as an example, the second display region 112 is disposed at the top end of the first display region 111, and the binding region 121 is disposed at the bottom end of the first display region 111. The first traces 311 extend downwardly from the first display region 112 to the binding region 121 and are electrically connected to the second flexible printed circuit board 250 within the binding region 121. In addition, data lines in the first display region 111 extend downwardly to the binding region 121 and are electrically connected to the first flexible printed circuit board 240 within the binding region 121.

With such setting, the first flexible printed circuit board 340 that drives the organic light emitting elements 310 to emit light and the second flexible printed circuit board 250 that drives the Micro LEDs 320 to emit light may be configured on the same side of the display panel 10, thereby facilitating simplification of a driving design of the display panel 10. At the same time, at least part of the encapsulation region 122 is reused to be provided with the first traces 311, so that the ratio of the non-display region in the display panel 10 may be reduced, the screen-to-body ratio may be improved, and the narrow frame design of the display panel 10 may be achieved.

It is to be noted that FIG. 3 merely exemplarily shows a case where the second display region 112 is disposed at the top end of the first display region 111, where the binding region 121 is disposed at the bottom end of the first display region 111, but is not intended to limit the embodiments of the present disclosure. In other embodiments, on the premise that the first flexible printed circuit board 240 and the second flexible printed circuit board 250 are disposed on the same side of the display panel 10, and that the vertical projection of the first traces 311 on the first substrate 210 and the vertical projection of the encapsulation frame 230 on the first substrate 210 are at least partially overlapped, the second display region 112 and the binding region 121 may also be disposed on any two opposite sides or any two adjacent sides of the first display region 111 according to the actual needs of the display panel 10, which is not limited in the embodiments of the present disclosure.

Secondly, it is to be noted that FIG. 3 merely exemplarily shows that the first traces 311 extend downwardly on the right side of the first display region 111 to the binding region 121, and in other embodiments, the first traces 311 may be provided to extend downwardly on the left side of the first display region 111 to the binding region 121, which is not limited in the embodiments of the present disclosure.

Optionally, still referring to FIG. 2, the first traces 311 are a reflection metal layer.

The first traces 311 are disposed between the first substrate 210 and the encapsulation frame 230. The reflection metal layer is a metal layer having a high reflectance to light (exemplarily, greater than or equal to 85%), and exemplarily the material of the reflection metal layer may include gold, silver, magnesium, and alloys thereof, as well as other metal materials known to those skilled in the art, which is not limited in the embodiments of the present disclosure.

In the embodiments of the present disclosure, the first traces 311 form the reflection metal layer, so that the light irradiated to the first traces 311 may be reflected and then irradiated to the encapsulation frame 230 again, and thus the light utilization rate of the light curing encapsulation is improved, and the encapsulation efficiency and the encapsulation effect are improved.

It is to be noted that when the glass frit is used for encapsulation, the reflection metal layer may be referred to as a frit metal and the material of the encapsulation frame may be referred to as a frit material. A vertical projection of the frit metal on the first substrate is within a vertical projection of the frit metal on the first substrate to ensure that the frit material does not deviate from the frit metal while the process accuracy is taken into account, and thereby good encapsulation is ensured.

In addition, it is to be noted that for the encapsulation frame 230, heat curing encapsulation or other encapsulation methods known to those skilled in the art in addition to light curing encapsulation may be used, which is not limited in the embodiments of the present disclosure.

Figure 4:
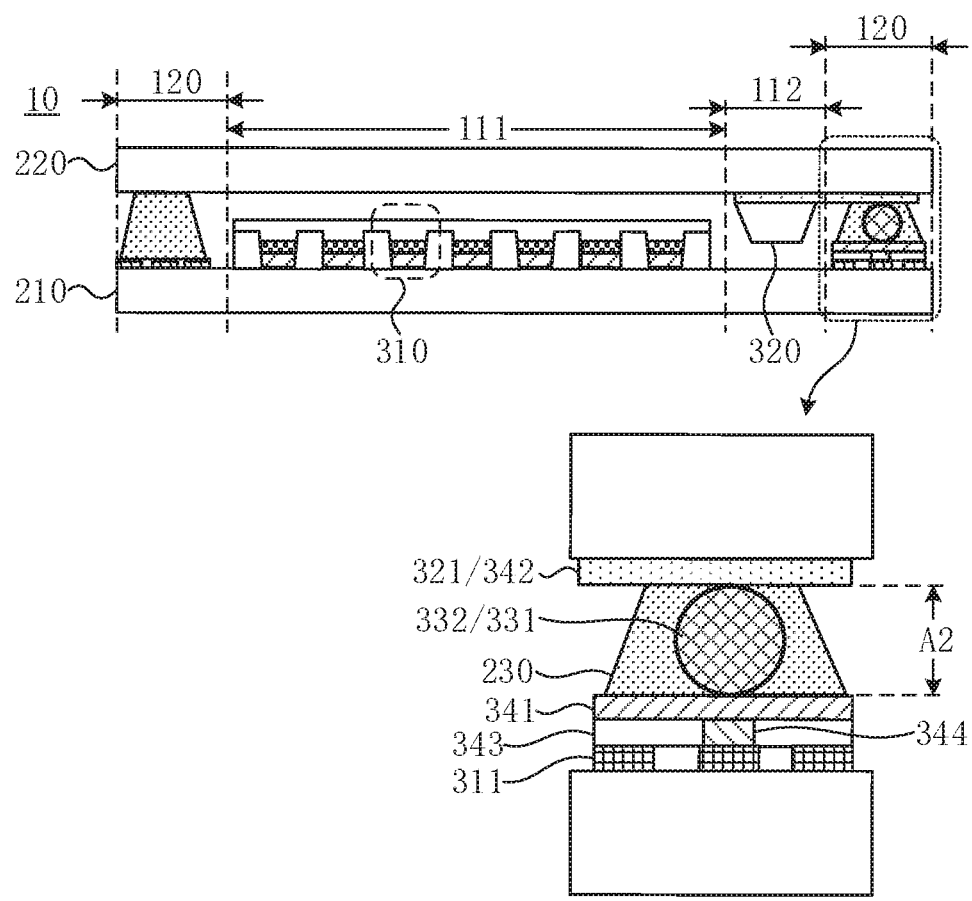
FIG. 4 is a structural diagram of another display panel according to an embodiment of the present disclosure.
Figure 5:
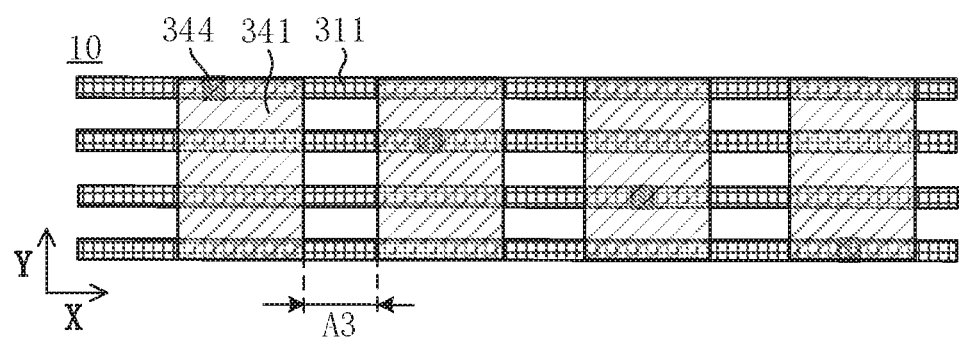
FIG. 5 is a schematic diagram illustrating connection between first traces and conductive pads of FIG. 4.
Figure 6:
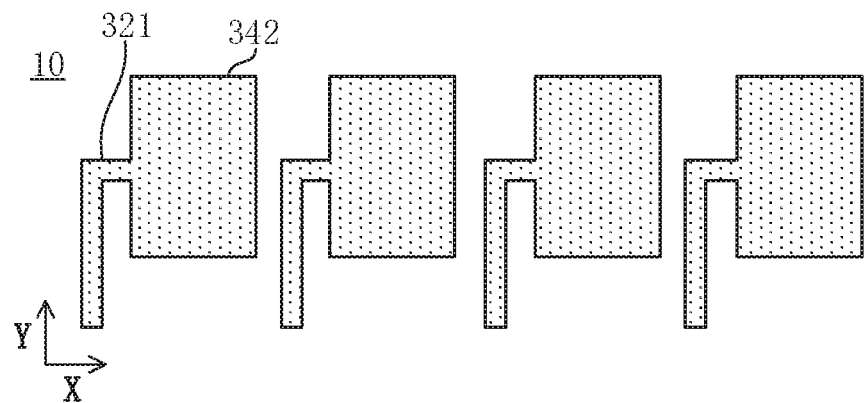
FIG. 6 is a schematic diagram illustrating connection between second traces and auxiliary conductive pads of FIG. 4.

Optionally, FIG. 4 is a structural diagram of another display panel according to an embodiment of the present disclosure, FIG. 5 is a schematic diagram illustrating connection between first traces and conductive pads of FIG. 4, and FIG. 6 is a schematic diagram illustrating connection between second traces and auxiliary conductive pads of FIG. 4. Combining FIGS. 4 to 6, the display panel 10 further includes a plurality of conductive pads 341, a plurality of auxiliary conductive pads 342 and an intermediate insulating layer 343. The plurality of conductive pads 341 are disposed between the encapsulation frame 230 and the first traces 311. The intermediate insulating layer 343 is configured between the plurality of conductive pads 341 and the first traces 311; the intermediate insulating layer 343 includes a plurality of via holes 344. The auxiliary conductive pads 342 are disposed in the same layer as the second traces 321, and the auxiliary conductive pads 342 are electrically connected to the second traces 321 in one-to-one correspondence. The first traces 311 are electrically connected to the conductive pads 341 in one-to-one correspondence through the via holes 344 of the intermediate insulating layer 343, and the conductive pads 341 are electrically connected to the second traces 321 in one-to-one correspondence through the conductive structure 331 in the encapsulation frame 230.

With such setting, each Micro LED 320 may be electrically connected to the second trace 321, the auxiliary conductive pad 342, the conductive structure 311 in the encapsulation frame 230, the conductive pad 341, and the first trace 311 in sequence to form their respective conductive paths, thereby avoiding the transmission disorder of driving signals of the different Micro LEDs 320, and the normal image display in the second display region 112 is achieved.

Exemplarily, the conductive structure 331 in the encapsulation frame 230 may be a conductive structure in a longitudinal direction, that is, the conductive structure 331 conducts in a direction perpendicular to the first substrate 210. At this time, to ensure that the conductive pads 341 may be electrically connected to the second traces 321 in one-to-one correspondence, the conductive pads 341 and the auxiliary conductive pads 343 may be disposed in one-to-one correspondence, a conductive pad 341 and an auxiliary conductive pad 343 which are disposed as a pair are at least partially overlapped in a direction perpendicular to the first substrate 210, and meanwhile a conductive pad 341 and an auxiliary conductive pad 343 which are not disposed as a pair are not overlapped in the direction perpendicular to the first substrate 210.

It is to be noted that FIG. 5 merely exemplarily shows the number of conductive pads 341 is 4, and that FIG. 6 merely exemplarily shows the number of auxiliary conductive pads 343 is 4, which does not intend to limit the display panel 10 provided in the embodiments of the present disclosure. In other embodiments, the number of conductive pads 341 and the number of auxiliary conductive pads may be disposed in accordance with the actual requirements of the display panel 10, which is not limited in the embodiments of the present disclosure.

Figure 7:
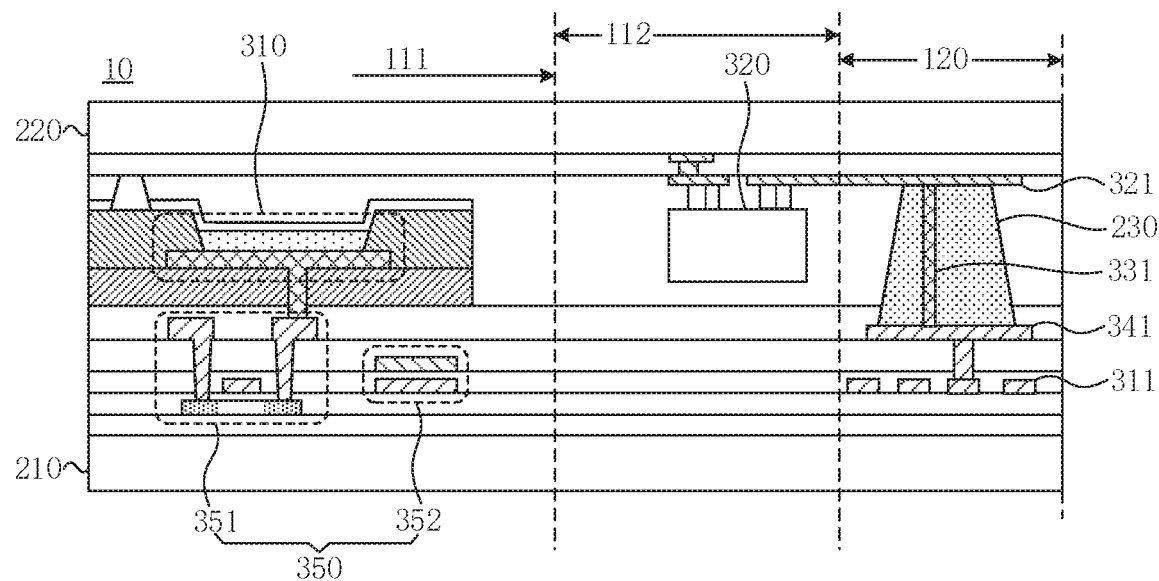
FIG. 7 is a structural diagram of another display panel according to an embodiment of the present disclosure.

Optionally, FIG. 7 is a structural diagram of another display panel according to an embodiment of the present disclosure. Referring to FIG. 7, in the first display region 111, a driving circuit 350 is configured on one side of the first substrate 210 facing towards the second substrate 220, and the driving circuit 350 at least includes a first metal layer and a second metal layer which are stacked in a direction facing away from the first substrate 210. The first traces 311 and the first metal layer are formed in the same process step by using the same material; and/or, the conductive pads 341 and the second metal layer are formed in the same process step by using the same material.

The driving circuit 350 is used for driving the organic light emitting elements 310 to emit light, and the driving circuit 350 may also be referred to as a pixel circuit or a pixel driving circuit.

Exemplarily, the driving circuit 350 includes a thin film transistor 351 and a storage capacitor 352. For example, the driving circuit 350 including a compensation circuit portion may be a 7T1C circuit, that is, a circuit including seven thin film transistors 351 and one storage capacitor 352.

Exemplarily, still referring to FIG. 7, a buffer layer, an active layer, a gate insulating layer, a first metal layer (that is, a gate metal layer), an interlevel dielectric layer, an intermediate conductive layer, an intermediate insulating layer, a second metal layer (that is, a source drain metal layer), a passivation layer, a planarization layer, and a pixel definition layer are stacked on the side of the first substrate 210 facing towards the second substrate 220. The pixel definition layer includes a plurality of pixel openings, and one organic light emitting element 310 is formed in each pixel opening.

In the embodiments of the present disclosure, the first traces 311 and the first metal layer are formed in the same process step by using the same material; and/or, the conductive pads 341 and the second metal layer are formed in the same process step by using the same material, that is, the first metal layer is patterned to be reused as the first traces 311; and/or, the second metal layer is patterned to be reused as the conductive pads 341. Therefore, there is no need to add a process step or introduce a new material, which is beneficial to simplifying the manufacturing process of the display panel 10 and saving the manufacturing cost of the display panel 10.

Exemplarily, the Micro LEDs 320 may be driven in an active driving mode or in a passive driving mode.

In condition that the Micro LEDs 320 are driven in the active driving mode, in the second display region 112, an auxiliary driving circuit is also configured on the side of the first substrate 210 facing towards the second substrate 220, or an auxiliary circuit is also configured on the side of the second substrate 220 facing towards the first substrate 210, and the auxiliary driving circuit is electrically connected to the Micro LEDs 320 for driving the Micro LEDs 320 to emit light. The driving circuit may be a 3T1C circuit, that is, a circuit including 3 thin film transistors and 1 storage capacitor. The number of thin film transistors is small and the Micro LEDs 130 are small in size, thereby forming a small light shielding region, and thus a larger light transmitting region may be reserved in the second display region 112. Meanwhile, in the display panel 10, when display is performed in the first display region 111 and the second display region 112, each of the organic light emitting elements 310 and the Micro LEDs 320 may implement self-luminescence in a current-driving manner. Therefore, the display difference between the first display region 111 and the second display region 112 is small, being beneficial to improving the display effect of the display panel 10.

In the condition that the Micro LEDs 320 are driven in the passive driving mode, it is not necessary to separately dispose a driving circuit for the Micro LEDs 320, and merely a signal line is needed to provide a light emitting voltage signal for the Micro LEDs 320, being beneficial to simplifying the lines in the second display region 112, making the light transmittance of the entire second display region 112 higher, and being beneficial to guaranteeing a high detection accuracy of the sensor.

In addition, in order to improve the light utilization rate of the sensor and make the sensor receive more ambient light, the Micro LEDs 320 in the embodiments of the present disclosure may also be transparent Micro LEDs, that is, the structure of each layer of the Micro LED 320 is formed by a transparent material. In the active driving mode, at least part of the film layer in the auxiliary driving circuit may also be formed by a transparent material. In the passive driving mode, the signal line may also be formed by a transparent material. The transparent material may be an Indium-Tin-Oxides (ITO) or other materials known to those skill in the art, which is not limited in the embodiments of the present disclosure.

It is to be noted that FIG. 7 only exemplarily shows one thin film transistor 351 and one storage capacitor 352, which is not intended to limit the display panel 10 in the embodiments of the present disclosure. In other embodiments, the number of thin film transistors 351 and the number of storage capacitors 352 in the driving circuit 350 may be set in accordance with the actual requirements of the display panel 10, which is not limited in the embodiments of the present disclosure.

Secondly, it is to be noted that FIG. 7 merely exemplarily shows the thin film transistor 351 of a top gate structure, which does not intend to limit the display panel 10 provided in the embodiments of the present disclosure. In other embodiments, the type and the film structure of the thin film transistor 351 may be set in accordance with the actual requirements of the display panel 10, which is not limited in the embodiments of the present disclosure.

Optionally, still referring to FIGS. 3, 5 and 6, the plurality of first traces 311 are arranged in a direction (exemplarily, a second direction Y shown in FIG. 5) from the display region 110 to the frame region 120, and the plurality of conductive pads 341 and the plurality of auxiliary conductive pads 342 are arranged in an extension direction of the frame region 120 (that is, a first direction X).

Optionally, a vertical projection of one conductive pad 341 on the first substrate 210 and a vertical projection of at least two first traces 311 on the first substrate 210 are partially overlapped.

With such a setting, the arrangement direction of the conductive pads 341 and the arrangement direction of the first traces 311 may be intersected, thereby saving the wiring space of the first traces 311. Meanwhile, the plurality of auxiliary conductive pads 342 and the plurality of conductive pads 341 are arranged in the same direction, so that the conductive pad 341 and the auxiliary conductive pad 342 corresponding to each other are conveniently electrically connected in the longitudinal direction through the conductive structure 331. In addition, the via holes 344 at the junctions between the conductive pads 341 and the first traces 311 may be arranged along the extending direction of the first traces 311, thereby increasing the flexibility of the size design of the conductive pads 341 and the flexibility of the magnitude design of an interval between adjacent conductive pads 341, and facilitating good electrical connection between the conductive pads 341 and the auxiliary conductive pads 342.

Exemplary, referring to FIGS. 3 and 5, FIG. 5 shows a partial structure of a connection region 124 in which a conductive structure 311 is provided, and the connection region 124 belongs to a partial region of the encapsulation region 122. In FIG. 5, the direction pointed from the display region 110 to the frame region 120 is the second direction Y, which is only an exemplarily explanation. For the first traces 311 on other sides, such as the first traces on the right side of the first display region 111 in FIG. 3, the direction from the display region 110 to the frame region 120 is the first direction X. For an irregularly shaped display region, the direction from the display region to the frame region may be another direction, which is not limited in the embodiments of the present disclosure.

Optionally, still referring to FIGS. 2 and 4, the conductive structure 331 includes an anisotropic conductive metal sphere 332.

The conductive metal sphere 332 includes a central conductive metal structure and an insulating layer covering the central conductive metal structure. The conductive metal sphere 332 is compressible, and when the compression reaches a certain degree, the insulating layer of the conductive metal sphere 332 is broken, and electrical connection may be achieved in the compression direction. The anisotropy of the conductive metal sphere 331 is embodied in that the compression direction may be any direction.

Exemplarily, in the embodiments of the present disclosure, the conductive metal sphere 332 is doped in the encapsulation frame 230, and during attaching and encapsulation of the first substrate 210 and the second substrate 220, the conductive metal sphere 332 is longitudinally compressed so as to be electrically connected to the conductive pad 341 and the auxiliary conductive pad 342 that overlap in a direction perpendicular to the first substrate 210. On this basis, the connection region 124 in FIG. 3 may also be referred to as a doped conductive sphere region.

It is to be noted that FIG. 4 merely exemplarily shows five conductive metal spheres 332 and that three of the five conductive metal spheres 332 may be longitudinally conductive, which is not intended to limit the display panel 10 in the embodiments of the present disclosure. In other embodiments, the sizes of and the number of conductive metal spheres 332 may be set according to the actual requirements of the display panel 10 on the premise that the conductive metal spheres 332 may form the longitudinally-conductive conductive structure 331 during attaching and encapsulation, which is not limited in the embodiments of the present disclosure.

Optionally, still referring to FIG. 4, the diameter of the conductive metal sphere 332 is A1, and in a direction perpendicular to a plane of the display panel 10, the distance between a film layer where the second traces 321 are located and a film layer where the plurality of conductive pads are located is A2. R is the compression ratio of the conductive metal sphere 332.

With such a setting, when the first substrate 210 is attached to the second substrate 220 for encapsulation through the conductive metal spheres 332, a continuously longitudinally-conductive conductive structure 331 is formed so that the auxiliary conductive pads 342 are electrically connected to the conductive pads 341.

It is to be noted that in the longitudinal direction, the number of conductive metal spheres 332 electrically connecting the conductive pads 341 to the auxiliary conductive pads 342 may be one, two, or more, and the conductive metal spheres are arranged in a plane parallel to the plane of the display panel 10. In the actual display panel product, the number of conductive metal spheres 332 may be set in accordance with actual requirements of the display panel 10, which is not limited in the embodiments of the present disclosure.

Optionally with such setting, the encapsulation frame 230 may be press-fitted in an appropriate proportion, so that the conductive metal spheres 332 may form the longitudinally-conductive conductive structure 331.

It is to be noted that the compression ratio R of the conductive metal sphere 332 may be set within the above-mentioned range in accordance with actual requirements of the display panel 10, exemplarily, $77\% \leq R \leq 80\%$, or $R=80\%$, which is not limited in the embodiments of the present disclosure.

Optionally, still referring to FIG. 5, an interval between adjacent conductive pads is A3, and the magnitude relationship between A3 and A1 satisfies that:

With such setting, on one hand, the interval A3 between adjacent conductive pads 341 is made large enough to avoid a line connection disorder caused by the conductive metal spheres 332 conducting adjacent disposed conductive pads 341; on the other hand, the interval A3 between the adjacent conductive pads 341 is not too large, and thereby space for disposing the conductive pads 341 is saved.

It is to be noted that the interval A3 between adjacent conductive pads may be set in accordance with actual requirements of the display panel 10, exemplarily, or, or $A3=10A1$, which is not limited in the embodiments of the present disclosure.

Figure 8:
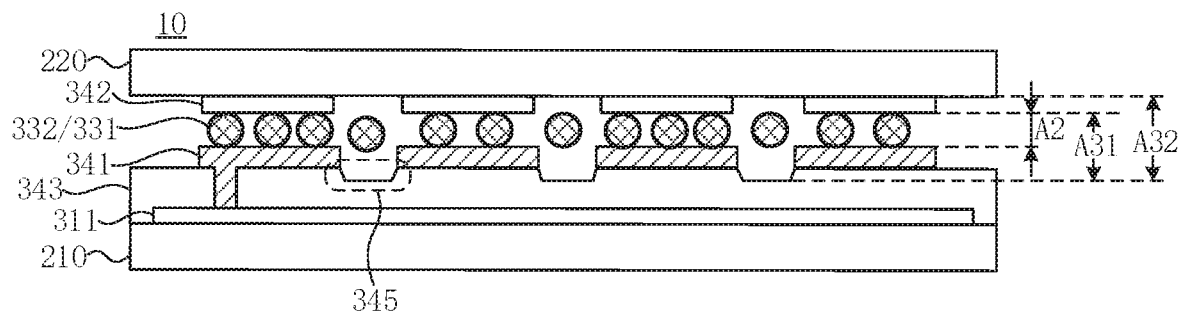
FIG. 8 is a structural diagram of another display panel according to an embodiment of the present disclosure.

Optionally, FIG. 8 is a structural diagram of another display panel according to an embodiment of the present disclosure. Referring to FIG. 8, a groove 345 is configured in a portion of the intermediate insulating layer 343 disposed between adjacent two conductive pads 341, and an opening of the groove 345 faces towards the second substrate 220.

With such a setting, in a direction perpendicular to the plane where the display panel is disposed, the spacing A2 between the conductive pad 341 at the position where the conductive pad 341 is provided and the auxiliary conductive pad 342 is smaller than the spacing between the surface of the insulating layer 343 at the position where the conductive pad 341 is not provided and the surface of a respective structure of the second substrate 220 facing towards the first substrate 210 (including the spacing A31 between the surface of the insulating layer 343 and the auxiliary conductive pads 342 and the spacing A32 between the surface of the insulating layer 343 and the surface of the second substrate 220 facing towards the first substrate 210). Thereby the conductive metal sphere 332 is easy to be compressed and broken to be conductive at a position where the conductive pad 341 faces opposite the auxiliary conductive pad 342, and meanwhile, the conductive metal spheres 332 at other positions are compressed to a less extent and are not conductive, thereby facilitating avoidance of conduction of adjacent conductive pads 341 and/or auxiliary conductive pads 342 and facilitating avoidance of electrical signal transmission disorders.

It is to be noted that FIG. 8 merely exemplarily shows four pairs of conductive pads 341 and auxiliary conductive pads 342 which are oppositely disposed in the display panel 10. A pair of conductive pad 341 and auxiliary conductive pad 342 are conducted by two or three conductive metal spheres 332, and one conductive metal sphere 332 is disposed at a position corresponding to the groove 345, which is not intended to limit the display panel 10 in the embodiments of the present disclosure. In other embodiments, the number of conductive pads 341, the number of auxiliary conductive pads 342, the number of conductive metal spheres 332, and the arrangement thereof may be set in accordance with the requirements of the display panel 10, which is not limited in the embodiments of the present disclosure.

On the basis of the above-mentioned embodiments, an embodiment of the present disclosure further provides a display device. The display device includes any one of the display panels provided in the above-mentioned embodiments. Therefore, the display device also has beneficial effects of the display panel provided in the above-mentioned embodiments; and similarities may be understood with reference to the above description and will not be repeated hereinafter.

Figure 9:
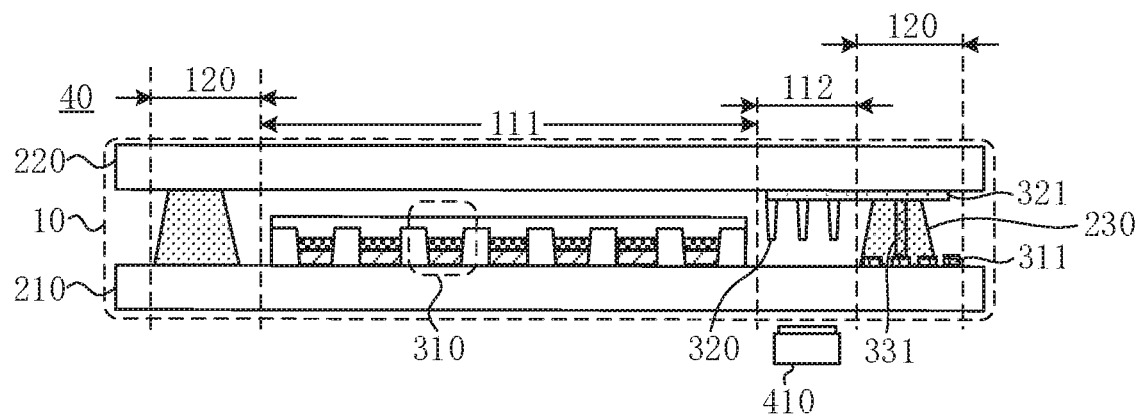
FIG. 9 is a structural diagram of a display device according to an embodiment of the present disclosure.

Exemplarily, FIG. 9 is a structural diagram of a display device according to an embodiment of the present disclosure. Referring to FIG. 9, a display device 40 includes a display panel 10, and further includes a sensor module 410. The sensor module 410 is disposed in the second display region 112 and disposed on one side of a first substrate 210 facing away from a second substrate 220. The light-sensitive surface of the sensor module 410 faces towards one side of the first substrate 210.

The sensor module 410 includes one or more of: a camera module, a photosensitive sensor, and an ultrasonic distance sensor.

Exemplarily, the display device 40 is a mobile phone or a tablet. When the sensor module 410 is a camera module, the second display region 112 corresponds to a region where a front-facing camera of the mobile phone or the tablet is disposed, the light emitting region is used for display, and the light transmitting region is configured to transmit the light beam into the front-facing camera for capturing an external image. When the sensor is a photosensitive sensor, the photosensitive sensor may be a photosensitive sensor for sensing external light beams and adjusting the light brightness of the display device, or may be a photosensitive sensor for sensing whether a fingerprint is present externally so as to perform fingerprint recognition. The photosensitive sensor also receives external light beams through the light transmitting region of the second display region 112 and then performs sensing, while the light emitting region is configured to display the image together with the first display region 111.

Exemplarily, the display device 40 may include a mobile phone, a tablet computer and a smart wearable device (such as a smartwatch), etc., which is not limited in the embodiments of the present disclosure.

Based on the same inventive concept, an embodiment of the present disclosure further provides a manufacturing method of a display panel, or it is understood that with the manufacturing method of a display panel, the display panel provided by the foregoing embodiments can be formed, so the manufacturing method of the display panel also has the beneficial effects of the display panel described above, and the same parts can be understood by referring to the above explanation of the display panel, and will not be described again hereinafter.

Figure 10:
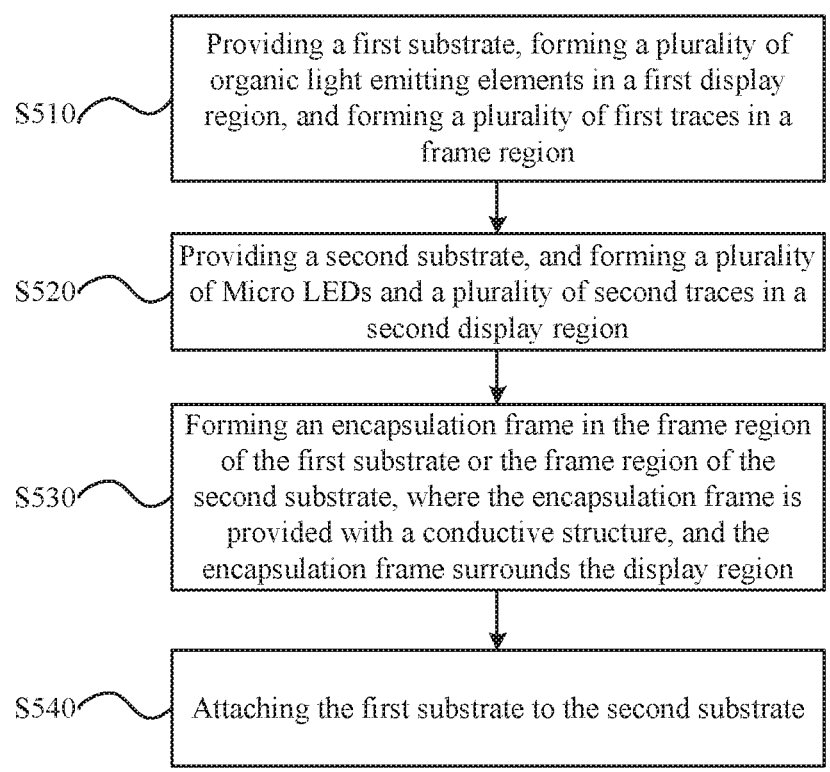
FIG. 10 is a flowchart illustrating a manufacturing method of a display panel according to an embodiment of the present disclosure.

Exemplarily, FIG. 10 is a flowchart illustrating a manufacturing method of a display panel according to an embodiment of the present disclosure. Referring to FIG. 10, the manufacturing method of the display panel includes the steps described below.

In step S510, a first substrate is provided, a plurality of organic light emitting elements are formed in a first display region, and a plurality of first traces are formed in a frame region.

Figure 11:
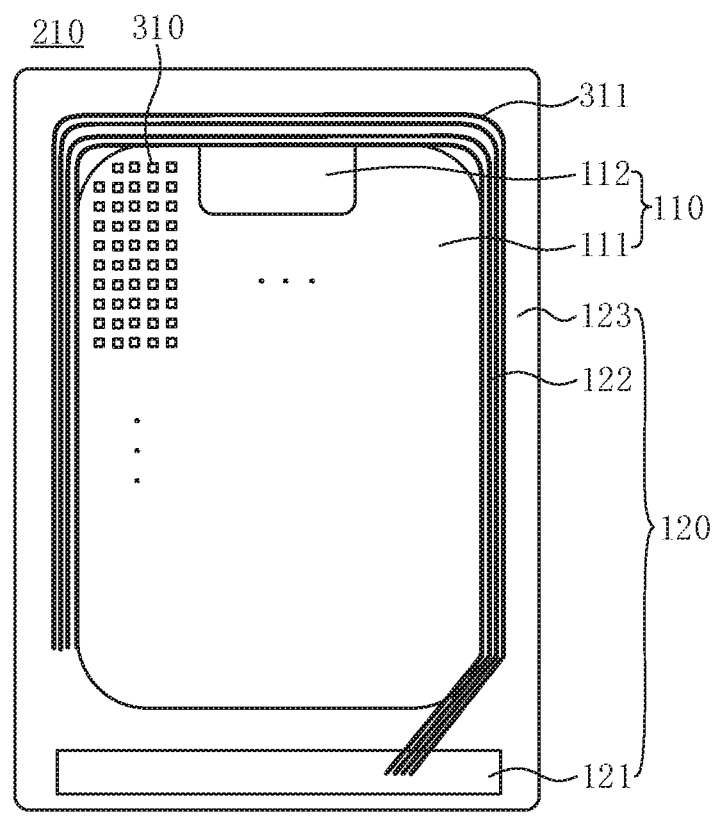
FIG. 11 is a structural diagram of a first substrate according to a step S510 shown in FIG. 10.

Exemplarily, FIG. 11 is a structural diagram of the first substrate according to the step S510 in FIG. 10. Referring to FIG. 11, the first substrate 210 includes a display region 110 and a frame region 120 surrounding the display region 110. The display region 110 includes a first display region 111 and a second display region 112, the second display region 112 is reused as a sensor reserved region, and the second display region 112 includes a light transmitting region and a light emitting region. The plurality of organic light emitting elements 310 are formed in the first display region 111, and the plurality of first traces 311 are formed in the frame region 120.

Exemplarily, the first substrate 210 may be an array substrate, and the organic light emitting element 310 may be formed in any manner known to those skilled in the art; the first traces 311 may be formed by patterning a conductive layer in an array substrate to form discrete traces, or by other means known to those skilled in the art, which are not limited in the embodiments of the present disclosure.

In step S520, a second substrate is provided, and a plurality of Micro LEDs and a plurality of second traces are formed in a second display region.

Figure 12:
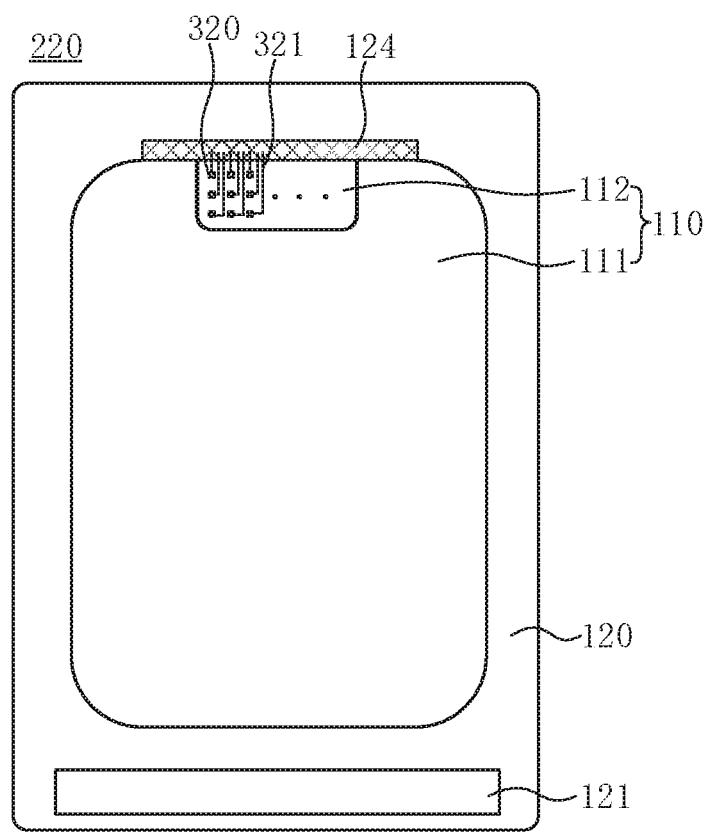
FIG. 12 is a structural diagram of a second substrate according to a step S520 shown in FIG. 10.

Exemplarily, FIG. 12 is a structural diagram of the second substrate according to the step S520 in FIG. 10. Referring to FIG. 12, the second substrate 220 includes a display region 110 and a frame region 120 surrounding the display region 110. The display region 110 includes a first display region 111 and a second display region 112. The second display region 112 is reused as the sensor reserved region, and the second display region 112 includes a light transmitting region and a light emitting region. The plurality of Micro LEDs 320 are formed in the light emitting region of the second display panel 112. The second traces 321 are electrically connected to the Micro LEDs, and the second traces 321 extend to the frame region 120 (a connection region 124 belongs to a partial region of the frame region 120).

The step includes a plurality of single-grain finished Micro LEDs are formed by a Micro LED manufacturing process, and that the Micro LEDs are fixedly electrically connected in each light emitting region, that is, the light emitting region is formed by the plurality of Micro LEDs.

It is to be noted that the Micro LED manufacturing process may be any process known to those skilled in the art, and is not described in detail again and is not limited in the embodiments of the present disclosure.

It is to be noted that the second traces 321 may be formed by film formation followed by patterning the film to form discrete traces, or by other means known to those skilled in the art, which is not limited in the embodiments of the present disclosure.

In step S530, an encapsulation frame is formed in the frame region of the first substrate or the frame region of the second substrate. The encapsulation frame is provided with a conductive structure, and the encapsulation frame surrounds the display region.

Exemplarily, a glass frit encapsulation process is used, and the step may include coating the glass frit around the display region 110 in the frame region 120, either on a side where the organic light emitting elements are formed on the first substrate, or on a side where the Micro LEDs are formed on the second substrate.

Optionally, the conductive structure includes a conductive metal sphere, and before coating the glass frit, the step further includes the conductive metal sphere is doped into the glass frit, and the doped glass frit is coated on the connection region 124 (see FIG. 12), and the undoped glass frit is coated on other regions.

The doping ratio of the conductive metal spheres into the glass frit may be set in accordance with actual requirements of the display panel 10, which is not limited in the embodiments of the present disclosure.

In step S540, the first substrate is attached to the second substrate.

So far, the display panel is formed.

Exemplarily, referring to FIG. 2, in the display panel 10, one side of the first substrate 210 provided with the organic light emitting elements 310 faces towards one side of the second substrate 220 provided with the Micro LEDs, the encapsulation frame 230 is disposed between the first substrate 210 and the second substrate 220; a vertical projection of the first traces 311 on the first substrate 210 and a vertical projection of the encapsulation frame 230 on the first substrate 210 are at least partially overlapped; and the second traces 321 are electrically connected to the first traces 311 through the conductive structure 311 in the encapsulation frame 230.

According to the manufacturing method of the display panel in the embodiments of the present disclosure, a vertical projection of the first traces 311 on the first substrate 210 and a vertical projection of the encapsulation frame 230 on the first substrate 210 are at least partially overlapped, so that the first traces 311 may be disposed in at least part of the encapsulation region 122, that is, reuse of the encapsulation region is achieved. Therefore, it is not necessary to provide one non-display region separately for disposing the first traces 311, so that the ratio of the non-display region in the display panel 10 may be reduced, the screen-to-body ratio may be improved, and the narrow frame design of the display panel 10 may be achieved.

It is to be noted that the above are merely preferred embodiments of the present disclosure and the technical principles used therein. It can be understood by those skilled in the art that the present disclosure is not limited to the specific embodiments described herein. Those skilled in the art can make various apparent modifications, adaptations, combinations and substitutions without departing from the scope of the present disclosure. Therefore, while the present disclosure has been described in detail through the above-mentioned embodiments, the present disclosure is not limited to the above-mentioned embodiments and may include more other equivalent embodiments without departing from the concept of the present disclosure. The scope of the present disclosure is determined by the scope of the appended claims.

What is claimed is:

1. A display panel, comprising: a first substrate and a second substrate disposed opposite to the first substrate;
    wherein the display panel comprises:
        a display region and a frame region surrounding the display region, wherein the display region comprises a first display region and a second display region, the second display region is reused as a sensor reserved region, and the second display region comprises a light transmitting region and a light emitting region;
        wherein in the first display region, a surface of the first substrate facing towards the second substrate is provided with a plurality of organic light emitting elements;
        wherein in the second display region, a surface of the second substrate facing towards the first substrate is provided with a plurality of Micro Light Emitting Diodes (LEDs) and a plurality of second traces, and the plurality of Micro LEDs are disposed in the light emitting region;
        wherein an encapsulation frame is further configured between the first substrate and the second substrate and is used for attaching the first substrate to the second substrate, and the encapsulation frame is disposed in the frame region and surrounds the display region;
        wherein in the frame region, the surface of the first substrate facing towards the second substrate is provided with a plurality of first traces;
        wherein vertical projections of the plurality of first traces on the first substrate are at least partially overlapped with a vertical projection of the encapsulation frame on the first substrate; and
        wherein the plurality of second traces are electrically connected to the plurality of Micro LEDs, the plurality of second traces extend to the frame region, wherein a conductive structure is configured in the encapsulation frame, and the plurality of second traces are electrically connected to the plurality of first traces through the conductive structure in the encapsulation frame;
        wherein the display panel further comprises: a plurality of conductive pads, a plurality of auxiliary conductive pads and an intermediate insulating layer;
        wherein the plurality of conductive pads are disposed between the encapsulation frame and the plurality of first traces, the intermediate insulating layer is disposed between the plurality of conductive pads and the plurality of first traces, the intermediate insulating layer comprises a plurality of via holes, the plurality of auxiliary conductive pads are disposed in a same layer as the plurality of second traces, and each of the plurality of auxiliary conductive pads are electrically connected to a respective one of the plurality of second traces; and
        wherein the plurality of first traces are electrically connected to the plurality of conductive pads in one-to-one correspondence through the plurality of via holes of the intermediate insulating layer, and the plurality of conductive pads are electrically connected to the plurality of second traces in one-to-one correspondence through the conductive structure in the encapsulation frame, so that the plurality of Micro LEDs are electrically connected to the plurality of first traces through the plurality of second traces, the plurality of auxiliary conductive pads, the plurality conductive pads and the conductive structure.

2. The display panel of claim 1, wherein the frame region comprises a binding region;
    wherein the binding region and the second display region are disposed on two opposite sides of the first display region; and
    wherein one end of each of the plurality of first traces is electrically connected to one of the plurality of second traces through the conductive structure in the encapsulation frame, and the other end of the each of the plurality of first traces extend to the binding region.

3. The display panel of claim 1, wherein the plurality of first traces are disposed in a first trace layer, wherein the first trace layer is reused as a reflection metal layer.

4. The display panel of claim 1, wherein in the first display region, a driving circuit is disposed on one side of the first substrate facing towards the second substrate, and wherein the driving circuit at least comprises a first metal layer and a second metal layer which are stacked in a direction facing away from the first substrate;
    wherein the plurality of first traces and the first metal layer are formed in a same process step by using a same material; and/or
    wherein the plurality of conductive pads and the second metal layer are formed in a same process step by using a same material.

5. The display panel of claim 1,
    wherein the plurality of first traces are arranged in a direction from the display region to the frame region, and the plurality of conductive pads and the plurality of auxiliary conductive pads are arranged in an extension direction of the frame region.

6. The display panel of claim 1,
    wherein a groove is configured in a portion of the intermediate insulating layer disposed between adjacent two conductive pads, and an opening of the groove faces towards the second substrate.

7. The display panel of claim 1, wherein the conductive structure comprises an anisotropic conductive metal sphere.

8. The display panel of claim 7, wherein a diameter of the conductive metal sphere is A1, and wherein in a direction perpendicular to a plane of the display panel, a distance between a film layer where the plurality of second traces are located and a film layer where the plurality of conductive pads are located is A2;
    wherein $A1 \geq A2/R$, wherein R is a compression ratio of the conductive metal sphere.

9. The display panel of claim 8, wherein $75\% \leq R \leq 85\%$.

10. The display panel of claim 8, an interval between adjacent conductive pads is A3, and $5A1 < A3 < I\ 5A1$.

11. A display device, comprising a display panel, wherein the display panel comprises:
    a first substrate and a second substrate disposed opposite to the first substrate;
    wherein the display panel comprises:
        a display region and a frame region surrounding the display region, wherein the display region comprises a first display region and a second display region, the second display region is reused as a sensor reserved region, and the second display region comprises a light transmitting region and a light emitting region;

wherein in the first display region, a surface of the first substrate facing towards the second substrate is provided with a plurality of organic light emitting elements;

wherein in the second display region, a surface of the second substrate facing towards the first substrate is provided with a plurality of Micro Light Emitting Diodes (LEDs) and a plurality of second traces, and the plurality of Micro LEDs are disposed in the light emitting region;

wherein an encapsulation frame is further configured between the first substrate and the second substrate and is used for attaching the first substrate to the second substrate, and the encapsulation frame is disposed in the frame region and surrounds the display region;

wherein in the frame region, the surface of the first substrate facing towards the second substrate is provided with a plurality of first traces;

wherein vertical projections of the plurality of first traces on the first substrate are at least partially overlapped with a vertical projection of the encapsulation frame on the first substrate; and wherein the plurality of second traces are electrically connected to the plurality of Micro LEDs, the plurality of second traces extend to the frame region, wherein a conductive structure is configured in the encapsulation frame, and the plurality of second traces are electrically connected to the plurality of first traces through the conductive structure in the encapsulation frame;

wherein the display panel further comprises: a plurality of conductive pads, a plurality of auxiliary conductive pads and an intermediate insulating layer;

wherein the plurality of conductive pads are disposed between the encapsulation frame and the plurality of first traces, the intermediate insulating layer is disposed between the plurality of conductive pads and the plurality of first traces, the intermediate insulating layer comprises a plurality of via holes, the plurality of auxiliary conductive pads are disposed in a same layer as the plurality of second traces, and each of the plurality of auxiliary conductive pads are electrically connected to a respective one of the plurality of second traces; and wherein the plurality of first traces are electrically connected to the plurality of conductive pads in one-to-one correspondence through the plurality of via holes of the intermediate insulating layer, and the plurality of conductive pads are electrical connected to the plurality of second traces in one-to-one correspondence through the conductive structure in the encapsulation frame, so that the plurality of Micro LEDs are electrically connected to the plurality of first traces through the plurality of second traces, the plurality of auxiliary conductive pads, the plurality of conductive pads and the conductive structure;

wherein the display device further comprises:

a sensor module, which is configured in the second display region and disposed on one side of the first substrate facing away from the second substrate, wherein a light-sensitive surface of the sensor module faces towards the first substrate side.

12. A manufacturing method of a display panel, comprising:

providing a first substrate, forming a plurality of organic light emitting elements in a first display region, and forming a plurality of first traces in a frame region; wherein the first substrate comprises a display region and the frame region surrounding the display region, wherein the display region comprises the first display region and a second display region, the second display region is reused as a sensor reserved region, and the second display region comprises a light transmitting region and a light emitting region;

providing a second substrate, forming a plurality of Micro Light Emitting Diodes (LEDs) and a plurality of second traces in a second display region, wherein the plurality of Micro LEDs are disposed in a light emitting region, wherein the plurality of second traces are electrically connected to the plurality of Micro LEDs, the plurality of second traces extend to a frame region, wherein the second substrate comprises a display region and the frame region surrounding the display region, wherein the display region comprises a first display region and the second display region, the second display region is reused as a sensor reserved region, and the second display region comprises a light transmitting region and the light emitting region;

forming an encapsulation frame in the frame region of the first substrate or the frame region of the second substrate, wherein the encapsulation frame is used for attaching the first substrate to the second substrate, a conductive structure is configured in the encapsulation frame, and the encapsulation frame surrounds the display region; and attaching the first substrate to the second substrate;

wherein one side of the first substrate provided with the plurality of organic light emitting elements faces towards one side of the second substrate provided with the plurality of Micro LEDs, the encapsulation frame is disposed between the first substrate and the second substrate, wherein vertical projections of the plurality of first traces on the first substrate are at least partially overlapped with a vertical projection of the encapsulation frame on the first substrate, and wherein the plurality of second traces are electrically connected to the plurality of first traces through the conductive structure in the encapsulation frame;

wherein the display panel further comprises: a plurality of conductive pads, a plurality of auxiliary conducive pads and an intermediate insulating layer;

wherein the plurality of conductive pads are disposed between the encapsulation frame and the plurality of first traces, the intermediate insulating layer is disposed between the plurality of conductive pads and the plurality of first traces, the intermediate insulating layer comprises a plurality of via holes, the plurality of auxiliary conductive pads are disposed in a same layer as the plurality of second traces, and each of the plurality of auxiliary conductive pads are electrically connected to a respective one of the plurality of second traces; and wherein the plurality of first traces are electrically connected to the plurality of conductive pads in one-to-one correspondence through the plurality of via holes of the intermediate insulating layer, and the plurality of conductive pads are electrically connected to the plurality of second traces in one-to-one correspondence through the conductive structure in the encapsulation frame, so that the plurality of Micro LEDs are electrically connected to the plurality of first traces through the plurality of second traces, the plurality of auxiliary conductive pads, the plurality of conductive pas and the conductive structure.

\* \* \* \* \*